Jan. 12, 1926.  1,569,477
R. GRAHAM
DEMOUNTABLE RIM
Filed May 19, 1924
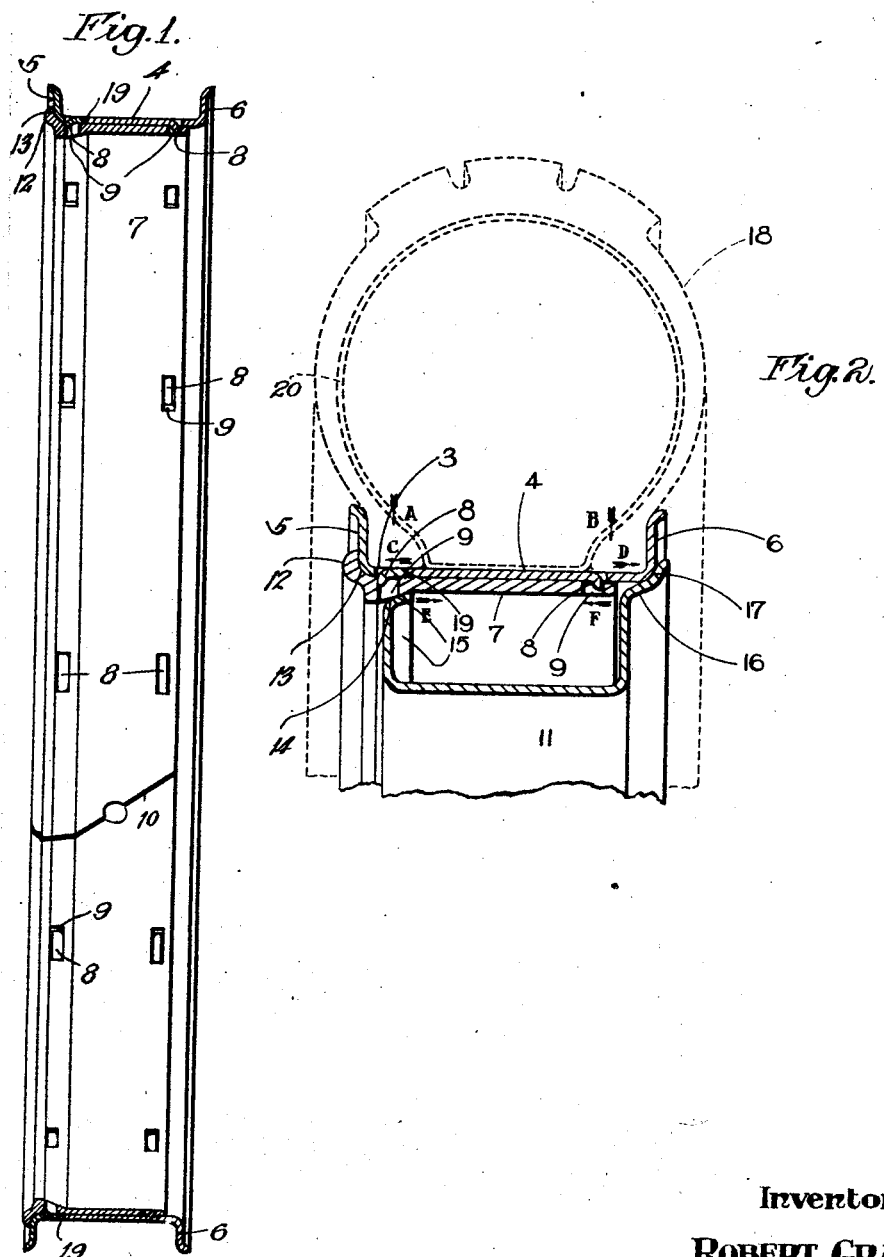
Inventor
ROBERT GRAHAM
By *E.H.Bond*
Attorney Patented Jan. 12, 1926.

1,569,477

UNITED STATES PATENT OFFICE.

ROBERT GRAHAM, OF TORONTO, ONTARIO, CANADA, ASSIGNOR TO AUTO RIM COMPANY LIMITED, OF TORONTO, ONTARIO, CANADA, A CORPORATION OF ONTARIO.

DEMOUNTABLE RIM.

Application filed May 19, 1924. Serial No. 714,399.

*To all whom it may concern:*

Be it known that I, ROBERT GRAHAM, a citizen of the Dominion of Canada, residing at 100 Avenue Road, in the city of Toronto, in the county of York, in the Province of Ontario and Dominion of Canada, have invented a new and useful Improvement in Demountable Rims, of which the following is a specification.

This invention appertains generally to the art of demountable rims, as described in the present specification and illustrated in the accompanying drawings, that form part of the same.

The invention consists essentially of the novel features pointed out broadly and specifically in the claims for novelty following a description containing an explanation in detail of an acceptable form of the invention.

Among the aims and objects of my invention may be cited the provisions of a demountable rim structure including, in combination, a circumferentially split rim, the sections of which are held together by a wedge-shaped locking ring positioned about the inner periphery thereof and engaged thereto, said locking ring being so configurated and associated with said rim and the felloe of a wheel when clamped thereto, that when said rim is subjected to stress through inflation of the tire or to dynamic increment, which would normally serve to separate the sections of said rim, such stress is counteracted in such a manner that it is employed to bind the sections of the rim together.

Other advantages and novel features of construction will be readily apparent upon a perusal of the following description read in conjunction with the accompanying drawings, in which:

Fig. 1 is a vertical section of a rim structure constructed in accordance with an acceptable form of my invention, and Fig. 2 is a fragmentary sectional view illustrating a portion of a circumferentially split rim, and the configuration of the locking ring and the association thereof with said rim and the felloe of a wheel, the section of said rim appearing as if pressed together against the wheel felloe, as when subjected to retroactive stress.

My invention includes, in combination, a circumferentially split rim forming the sections 3 and 4, which are provided with tire retaining flanges 5 and 6, which may be of any approved type, as the same is immaterial to my invention which has a wide range of utility in that respect.

The rim sections 3 and 4 are held together by a locking ring 7, which fits about the inner periphery of said rim and is engaged to the sections thereof, by the protuberances 8 carried by said sections seating in the elongated perforations 9 formed in the locking ring in spaced relation, corresponding to the relation of said protuberances.

For assembling and dismantling purposes the locking ring is severed as at 10, in Fig. 1.

For the purpose of illustration, I have shown a metallic wheel felloe 11 upon which the rim structure may be mounted, it being understood however that the same is also applicable to the wooden wheel felloe and other wheel felloes of conventional design.

The locking ring 7 is provided with the circumferential flange 12 which abuts section 3 of the rim as at 13, and the inclined or wedging surface 14 which bears against the inclined annular flange 15 of the felloe 11, which is also provided with a rim abutting flange 16, against which section 4 of the rim bears as at 17.

To assemble the components of the rim structure, the rim sections 3 and 4 are positioned about the beads of the tire shown in dotted position and indicated by the numeral 18, in contiguous relation, the protuberances 8 being transversely aligned. The diameter of the locking ring is slightly diminished by pressing one portion thereof inwardly where it is severed, after which it is positioned about the inner periphery of the rim sections, the protuberances 8 of which enter the elongated perforations 9 of the locking ring. The depressed portion is then released and permitted to spring into position, after which the necessary clamping appurtenances are applied for clamping the rim structure to the wheel felloe.

When the tire carried by the rim is inflated to standard pressure, or when the rim is subjected to dynamic increment, the sections of the rim are forced outwardly and stress is exerted in the directions indicated by the arrows C and D in Fig. 2. Such stress impinges the flange 12 of the locking ring 7 as at 13 and flange 16 of the felloe 11 as at 17, and is resultantly counteracted in the directions indicated by the arrows E and F. Thus the inclined or wedging surface 14 of the locking band is wedged against the inclined flange 15 of the felloe 11, which serves to force the sections 3 and 4 of the rim together forming a very tight joint 19, which is maintained by the stress in the direction indicated by the arrows E and F.

Vertical stress in the direction indicated by the arrows A and B serves to maintain the sections 3 and 4 of the rim in transverse alignment.

From the foregoing it will be comprehended that the retroactive stress action described is solely depended upon for retaining the sections of the rim together when the same is subjected to stress through inflation of the tires or dynamic increment, and that all stress is removed from the protuberances 8, thus obliterating all possibility of buckling or shearing.

By having the circumferential split in close proximity to the flange 5, the same will come under the base of the tire 18 as shown, and the possibility of the inner tube 20 becoming pinched in the split is obviated.

The method of clamping the rim structure to the wheel felloe does not constitute a part of the present invention and therefore an elucidation of the means for that purpose has been omitted.

What I claim is:

1. In a wheel structure, the combination with a felloe, of a rim in sections; a locking ring positioned about the inner periphery of said rim sections; means on said locking ring abutting the side of one of said rim sections; wedging means on said locking ring abutting said felloe; and means on said felloe abutting the side of the other said rim section.

2. In a wheel structure, the combination with a felloe, of a rim in sections; a locking ring positioned about the inner periphery of said rim sections; means on said locking ring abutting the side of one of said rim sections; wedging means on said locking ring abutting said felloe; means on said felloe abutting the side of the other said rim section; and means on said rim sections engaging said locking ring for holding said rim sections in abutting relation.

3. In a wheel structure, the combination with a felloe, of a rim in sections; a locking ring positioned about the inner periphery of said rim sections having an annular flange laterally abutting one of said rim sections; an annular wedging surface on said locking ring abutting said felloe; and an annular flange on said felloe laterally abutting the other said rim section.

4. In a wheel structure, the combination with a felloe, of a rim in sections; a locking ring positioned about the inner periphery of said rim sections having an annular flange laterally abutting one of said rim sections; an annular wedging surface on said locking ring abutting said felloe; an annular flange on said felloe laterally abutting the other said rim section; and means on said rim sections engaging said locking ring for holding said rim sections together.

5. In a wheel structure, the combination with a felloe having an annular wedging flange and an annular abutting flange, of a rim in sections; protuberances on the inner periphery of said rim sections; a locking ring positioned about the inner periphery of said rim sections having perforations to receive said protuberances; an annular flange on said locking ring laterally abutting one of said rim sections; an annular wedging surface on said locking ring abutting the annular wedging flange on said felloe; the other said rim section abutting said annular abutting flange on said felloe.

6. A rim in sections, each section having protuberances, a locking ring having spaced perforations to receive said protuberances, said ring having a circumferential flange abutting one section, and a wedging surface to engage an inclined annular flange on the wheel felloe, the other section adapted to abut against an abutting flange on the felloe, said sections extended in transverse alignment.

Signed at the city of Toronto, county of York and Province of Ontario in the Dominion of Canada, this 15th day of May, 1924.

ROBERT GRAHAM.